(12) United States Patent
Schwaneberg et al.

(10) Patent No.: US 8,058,616 B2
(45) Date of Patent: Nov. 15, 2011

(54) APPARATUS FOR AUTHENTICATING A PERSON OF AT LEAST ONE BIOMETRIC PARAMETER

(75) Inventors: Oliver Schwaneberg, Bonn (DE); Norbert Jung, Langerwehe (DE); Dietmar Reinerl, Sankt Augustin (DE)

(73) Assignee: Fachhochschule Bonn-Rhein-Sieg, Sankt Augustin (DE)

( * ) Notice: Subject to any disclaimer, the term of this patent is extended or adjusted under 35 U.S.C. 154(b) by 0 days.

(21) Appl. No.: 12/595,759

(22) PCT Filed: Apr. 2, 2008

(86) PCT No.: PCT/EP2008/053918
§ 371 (c)(1),
(2), (4) Date: Feb. 2, 2010

(87) PCT Pub. No.: WO2008/125491
PCT Pub. Date: Oct. 23, 2008

(65) Prior Publication Data
US 2010/0148068 A1  Jun. 17, 2010

(30) Foreign Application Priority Data
Apr. 14, 2007 (DE) .................. 10 2007 017 713

(51) Int. Cl.
*G01J 5/20* (2006.01)
(52) U.S. Cl. .................................. 250/338.4
(58) Field of Classification Search .... 250/338.1–338.5, 250/330–335, 336.1–336.2, 337, 339.1–339.15, 250/340, 341.1–341.8
See application file for complete search history.

(56) References Cited

U.S. PATENT DOCUMENTS
4,500,784 A * 2/1985 Hacskaylo ............... 250/339.11
(Continued)

FOREIGN PATENT DOCUMENTS
DE  19958378  11/2000
(Continued)

OTHER PUBLICATIONS
Nixon et al., "Multispectral Fingerprint Imaging for Spoof Detection,", 2005, SPIE Proceedings, vol. 5779, pp. 214-225.*
(Continued)

*Primary Examiner* — Kiho Kim
(74) *Attorney, Agent, or Firm* — Renner, Otto, Boisselle & Sklar, LLP

(57) ABSTRACT

The apparatus for authenticating a person on the basis of at least one biometric parameter, particularly on the basis of a fingerprint, comprises a biometric detector (20) for detecting a biometric parameter, a skin detector (24) for identifying, in a contactless manner, living human skin within a scanning area. The skin detector (24) is provided with at least one group encompassing at least one radiation unit (26,28) and at least one reception unit (30). The at least one radiation unit (26,28) emits radiation in the direction of the scanning area at least at two different wavelengths ranging from 400 nm to 1500 nm, at least one of the wavelengths (26,28) ranging from 900 nm to 1500 nm, while the at least one reception unit (30) receives radiation reflected from the scanning area. The apparatus further comprises a signal evaluation unit (22) that is connected to the biometric detector (20) and the skin detector (24) and is used for evaluating the intensity of the reflected radiations of the radiation unit (26,28) which are received by the reception unit (30). Based on the intensities of the reflected radiations of the radiation unit (26,28) which are received by the reception unit (30) at the two different wavelengths, the signal evaluation unit (22) can determine whether the skin detector identifies living human skin. Detecting living human skin is a prerequisite for outputting an authentication signal.

21 Claims, 1 Drawing Sheet

U.S. PATENT DOCUMENTS

Figure 1:
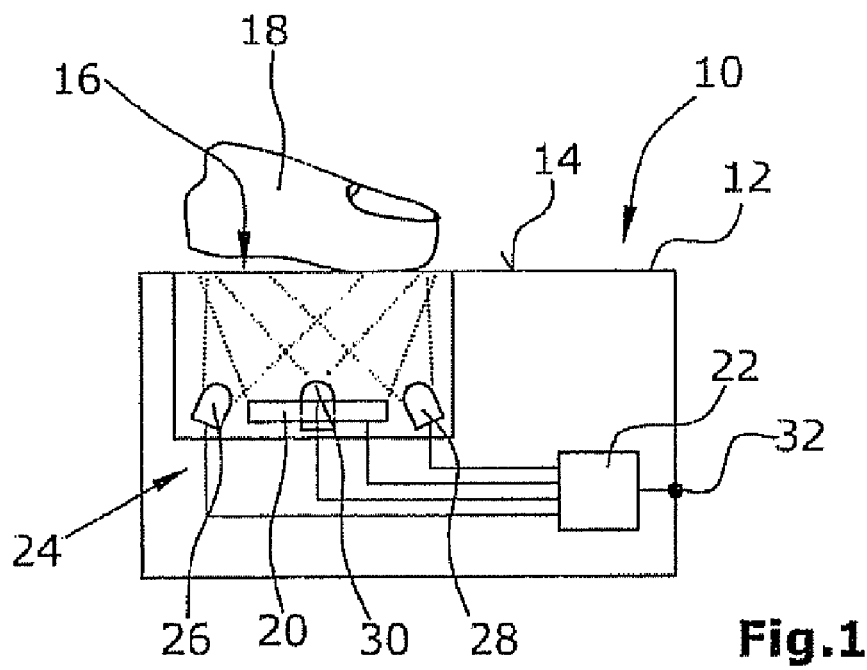

| | | | | |
|---|---|---|---|---|
| 5,719,950 | A | * | 2/1998 | Osten et al. .................... 382/115 |
| 6,292,576 | B1 | * | 9/2001 | Brownlee ...................... 382/124 |
| 2003/0053664 | A1 | | 3/2003 | Pavlidis et al. |
| 2008/0203307 | A1 | * | 8/2008 | Determan et al. ......... 250/341.8 |

FOREIGN PATENT DOCUMENTS

| | | |
|---|---|---|
| EP | 1952302 | 8/2008 |
| WO | 01/59692 | 8/2001 |

OTHER PUBLICATIONS

Iwasaki et al., "Visualization of the human face skin moisturizing-ability by spectroscopic imaging using two near-infrared bands,", 2006, SPIE Proceedings, vol. 6062, pp. 606203-1 to 606203-8.*

Dowdall et al., "Face Detection in the Near-IR system,", 2003, Image and Visiion Computing, vol. 21 pp. 565-578.*

Curcio et al., "The Neat Infrared Absorption Spectrum of Liquid Water", Naval Research Laboratory, 1951, vol. 41, pp. 302-304.

Nixon et al., "Multispectral Fingerprint Imaging for Spoof Detection", XP-008098861, Biometric Technology for Human Identification II, Proceedings of SPIE vol. 5779, pp. 214-225.

Nixon et al., "Novel spectroscopy-based technology for biometric and liveness verification", XP-001509175, Biometric Technology for Human Identification, Proceedings of SPIE vol. 5404, pp. 287-295.

Matsumoto et al., "Impact of Artificial 'Gummy' Fingers on Fingerprint Systems", Graduate School of Environment and Information Sciences, Oprical Security and Counterfeit Deterrence Techniquies IV, Proceedings of SPIE vol. 4677, 2002, pp. 275-289.

Toth, "Biometric Liveness Detection", Information Security Bulletin, Oct. 2005, vol. 10, pp. 291-297.

International Search Report for corresponding application No. PCT/EP2008/053918 dated Nov. 28, 2008.

* cited by examiner

APPARATUS FOR AUTHENTICATING A PERSON OF AT LEAST ONE BIOMETRIC PARAMETER

The invention relates to an apparatus for authenticating a person on the basis of at least one biometric parameter, said parameter being particularly the fingerprint of the person.

It is known to use authentication apparatus or processes to protect e.g. the access to safety-sensitive premises or the initiation of safety-sensitive transactions (e.g. banking transactions). The person wishing to gain access to the safety-sensitive premises or to perform safety-sensitive transactions, has to authenticate himself/herself inter alia on the basis of biometric parameters. Particularly, the fingerprint of the person will be examined and compared to the stored fingerprints of all persons who are authorized to have access to the safety-sensitive premises and respectively to take part in the safety-sensitive transactions.

Fingerprint scanners are generally known in the state of the art. These operate e.g. by use of cameras which take the fingerprint, wherein a comparison will be performed with stored fingerprints.

Such fingerprint scanners may be manipulated by "artificial" fingerprints. For this reason, fingerprint scanners are known from the state of the art which will additionally examine whether the finger which has been placed on the scanning area is truly a "real" finger. With the aid of ultrasound, these known systems will measure e.g. the temperature, the pulse, the blood oxygen content, the blood pressure, the electric resistance of the skin, or the tissue under the skin.

All of these measuring methods are susceptible to fraud committed by use of thin silicone fingerprints or gelatin fingerprints which are laid over the finger of the person manipulating the fingerprint scanner, and by tempering or wetting an artificial finger.

From DE 199 58 378 A1, an apparatus for identity check of persons is known. This apparatus comprises a biometry detector for detection of a biometric parameter of the person. Said detector is further operative to detect living biological tissue by optical scanning of the pulse frequency.

WO 01/59692 A1 describes a fingerprint pressure sensor with automatic activation. In order to save energy, the fingerprint pressure sensor can be switched between a sleep mode and the full function. As long as no finger has been placed on the sensor, the fingerprint pressure sensor will remain in the sleep mode in which the power consumption is very low.

It is an object of the invention to provide an apparatus for authenticating a person on the basis of at least one biometric parameter, particularly on the basis of a fingerprint, which apparatus is better protected against manipulation committed particularly by use of artificial tissue.

To achieve the above object, the invention proposes an apparatus for authenticating a person on the basis of at least one biometric parameter, particularly on the basis of a fingerprint, wherein, according to a first variant of the invention, said apparatus comprises a biometry detector for detection of a biometric parameter,
a skin detector for contactless detection of living human skin within a scanning area,
said skin detector comprising at least one array of at least two transmission diodes and at least one reception diode,
said at least two transmission diodes emitting, in the narrow spectral bandwidth range, radiation of at least two different transmission wavelengths in a wavelength range between 400 and 1500 nm in the direction toward the scanning area, at least one of the transmission diodes radiating in a wavelength range between 900 nm and 1500 nm, and said at least one reception diode receiving radiation reflected from the scanning area, and
a signal evaluation unit connected to the biometry detector and the skin detector, for evaluation of the intensity of the reflected radiations of the transmission diodes as received by the reception diode,
on the basis of said intensities of the reflected radiations of the transmission diodes, it being determinable in said signal evaluation unit whether the detector is detecting living human skin, and
the detection of living human skin being a precondition for the outputting of authentication signal.

This variant of the invention provides that, in an apparatus for authenticating a person on the basis of at least one biometric parameter, particularly on the basis of a fingerprint, it will be detected in a contactless manner whether living human skin is present. According to the invention, this is performed with the aid of a detector comprising an array of at least three semiconductor diodes. At least two of said semiconductor diodes are trans-mission diodes while at least one of said semiconductor diodes is formed as a reception diode. The transmission diodes are operative to emit, in the narrow spectral bandwidth range, radiation of at least two different transmission wavelengths in a wavelength range between 400 and 1500 nm, namely in the direction of the scanning area. Said at least one reception diode will receive the radiation of the transmission diodes that is reflected from the scanning area, i.e. the re-emissions. This is suitably performed successively, so that the signal of the reflected radiations that is received by the reception diode, and particularly the intensities of these radiations, can be assigned to each of the transmission diodes. The reception diode emits a signal representing the intensity of the respective reflected radiation.

In a signal evaluation unit, the received signals of the reception diode or reception diodes are evaluated, wherein, according to the invention, the intensities of the reflected radiations of the transmission diodes are set into relation with each other (e.g. quotient or difference formation, or comparison) in the signal evaluation unit. These (re-emission) intensities have different values depending on whether the radiations are reflected by living skin, i.e. vital and metabolically active skin, or non-living skin (e.g. a silicone or gelatin finger sheath or fingerprint). Thereby, it can be reliably determined whether it is human skin, i.e. a "living" human finger, that is present in the scanning area of the biometry detector, which scanning area is detected in a contactless manner by the detector. Only if such human skin has been unambiguously detected, the apparatus of the invention will output an authentication signal, provided that the examination of the biometric parameters has had a positive result.

The contactless skin detector provided according to the invention is operating at least with a wavelength in the near-infrared range, i.e. in the range between 900 nm and 1500 nm. Tests performed on the human skin have revealed that, for various skin colors and illumination situations, this wavelength range is very well adapted for reliably differentiating living skin particularly from non-living skin or skin imitations. A detector working in the above mentioned wavelength range will also hardly be exposed to electric and thermal influences, influences by humidity, or variations of the illumination situation. Also the dependency on skin tones is negligible.

One of the transmission diodes can radiate in the range below 900 nm. Preferably, however, all of the transmission diodes will radiate in the near-infrared range.

In the wavelength range selected according to the invention, the re-emission spectrum of living human skin is distinctly different from the re-emission spectrum of e.g. an artificial finger and, respectively, of non-living human skin so that, by the examination (e.g. quotient or difference formation or comparison) of the re-emission intensities at least at two points of the wavelength spectrum, a clear differentiation can be made between living human skin and non-living human skin or skin imitations.

Thus, according to the invention, radiation—preferably in the narrow spectral bandwidth range (e.g. maximally 50 nm to 200 nm)—will be emitted at least at two different transmission wavelengths, which radiation upon reflection in the scanning area will be received by a preferably wide-spectral-bandwidth diode or a plurality of such diodes. Diverse semiconductor diodes (illuminating diodes) for narrow-spectral-bandwidth radiation within the wavelength range of relevance herein are available on the market at reasonable prices. Thus, for realizing the detector, on can draw on inexpensive components which are already offered on the market, with a resultant reduction of the costs for the detector provided by the invention.

Also the evaluation of the signals of the detector can be performed conceivably quickly. Notably, it will only be the integrals which will be evaluated on the basis of the re-emission radiation received from the scanning area. These signals are delivered by the reception diode so that the signals will be available directly and quickly, and consequently can also be evaluated directly.

It is suitable if a plurality of groups of semiconductor diodes, each group consisting of at least two transmission diodes and at least one common reception diode, are arranged in a row or line or in several rows or lines following each other.

The wavelengths—selectable for detection—in the near-infrared range as proposed according to the invention will suitably be selected to the effect that the re-emission intensities during reflection on living human tissue are clearly different from other biological tissue or other materials. Transmission diodes which are operative to transmit at these preferred wavelengths (narrow spectral bandwidth), do exist, as already mentioned above, and are normally available at low cost. Preferred use is made of a detector comprising transmission semiconductor diodes and a reception semiconductor diode, the wavelengths of the transmission diodes preferably being 950 nm and 1450 nm, 950 nm and 1050 nm, 950 nm and 1200 nm, 1050 nm and 1200 nm, 1050 nm and 1300 nm, 1050 nm and 1450 nm or 1200 nm and 1450 nm.

A certain disadvantage when using commercially available semiconducting transmission diodes is to be seen in that these diodes will emit their radiation only with relatively low intensity. Thus, in consideration of the ambient light and the environmental influences, it may happen that the radiation received by the reception diode is too weak to allow for sufficiently reliable results. Therefore, according to an advantageous embodiment of the invention, there is provided a mutual overlap of those transmission diodes of two adjacent groups which are radiating at the same wavelength, i.e. it is provided that these two transmission diodes will illuminate a common portion of the scanning area so that, now, the reflected radiation will again be sufficiently intensive to allow for it to be reliably received by the reception diode or diodes. Alternatively or additionally thereto, the transmission diodes can also be pulsed so as to be able to briefly emit an increased radiation energy without being operated above their maximum allowable dissipation loss. For improvement of the signals, it is also optionally possible to arrange optical elements, such as e.g. lenses, before the transmission and/or reception diodes.

According to a preferred embodiment of the invention, it is further provided that, in the signal evaluation unit, the ambient light received by the reception diode or diodes can be compensated for, resulting in that the light of the transmission diodes reflected from the scanning area will remain a pure useful signal.

Further, it is of advantage if the transmission diodes radiating in the narrow spectral bandwidth have a spectral bandwidth of up to 200 nm at maximum, the spectral bandwidth being defined as that range within which the transmission diodes are radiating with at least 50% of the maximum intensity.

Further, it is possible to design a detector for detection of living human skin or, generally, living human tissue (e.g. iris diaphragm), which is operative with more than two wavelengths. As a possible constellation for a system with e.g. three wavelengths, a combination of the wavelengths of 1050 nm, 1300 nm and 1450 nm is of interest. In this combination, there are considered the two most distinct drops of the re-emission intensity for living human tissue, such as e.g. skin, in the near-infrared range. Further, it is to be mentioned that this constellation will combine all wavelengths of the two best-evaluated wavelength pairs. However, it should be noted that, at 1450 nm, the typical re-emission intensity of living human skin is very weak. A more viable solution would reside in the automatic switching to operation with two wavelengths in cases where the signal of the measurement at 1450 nm would be too weak. Thus, in some cases, the detector would work like a detector with two wavelengths.

At this point, it is to be emphasized that the invention is not restricted to the realization of the detector having a plurality of transmission diodes. Expressed in very general terms, the detector comprises a transmission unit and a reception unit, with said transmission unit radiating at least at two different wavelengths in the range of 400 nm to 1500 nm, at least one of these wavelengths being in the range between 900 nm and 1500 nm. Thus, for instance, it is possible, depending on the position of the wavelengths, to radiate these e.g. by a sole semiconductor diode. It could also be provided to generate the narrow-spectral-bandwidth detection radiations by filtration of the radiation of a broader-spectral-bandwidth radiation source. Thus, the above and subsequent explanations with regard to the detector have to be understood to the effect that this detector is not restricted to a certain number of transmission diodes. Instead, use can be made of a sole transmission source designed for transmission in the narrow spectral bandwidth range at one or a plurality of wavelengths.

Further, it is to be emphasized at this point that the formation of a relation among the received radiation intensities at the different wavelengths is to refer particularly to a difference formation or quotient formation of the respective intensity values, or to a comparison of these values. The manner in which the measured intensity values of the reflected radiations are set into relation to each other will primarily depend on the application. For the detection of living human skin, i.e. skin still being supplied with blood or being metabolically active, it has been found useful—as a (further) verification that a biometric parameter captured by a biometry detector is recognized as coming from an existing person—to form the quotient from said at least two re-emission intensity values wherein, in this context, it is totally irrelevant which intensity values will be used as divisor or dividend.

Finally, it should be stated that the invention is not restricted to the use of semiconductor components as a radiation and respectively transmission unit and a reception unit. Consequently, the invention is quite generally related to a an apparatus for authenticating a person on the basis of at least one biometric parameter, particularly on the basis of a fingerprint, wherein said apparatus comprises a biometry detector for detection of a biometric parameter,
a skin detector for contactless detection of living human skin within a scanning area,
said skin detector comprising at least one array of at least one radiation unit and at least one reception unit,
said at least one radiation unit emitting radiation of at least two different wavelengths in a wavelength range between 400 and 1500 nm in the direction toward the scanning area, at least one of said wavelengths being in the wavelength range between 900 nm and 1500 nm, and said at least one reception unit receiving radiation reflected from the scanning area, and
a signal evaluation unit connected to said biometry detector and said skin detector for evaluation of the intensity of the radiations of said radiation unit as received by said reception unit, wherein, on the basis of said intensities of the reflected radiations of the radiation unit as received by the reception unit at the two different wavelengths, it is determinable in said signal evaluation unit whether said skin detector is detecting living human skin, and the detection of living human skin being a precondition for the outputting of authentication signal.

For the invention in its general form, it is decisive that the intensities of the re-emissions at least at two of the above mentioned wavelengths are selectively detected and examined because, on the basis of these re-emissions, a reliable conclusion can be drawn to living skin and respectively non-living skin. In this regard, it is possible that the transmission unit is operative for radiation in the broad spectral bandwidth and the reception unit is operative for reception in the narrow spectral bandwidth at said at least two wavelengths, or that both the transmission unit and the reception unit are designed for the broad spectral bandwidth while, however, the required selection of said at least two wavelengths or wavelength ranges will be effected with the aid of wavelength-selective filtration.

Advantageously, one of the wavelengths of the radiation unit is below 900 nm. Preferably, it is provided that the wavelengths of the radiation unit are wavelengths of 950 nm and 1450 nm, 950 nm and 1050 nm, 950 nm and 1200 nm, 1050 nm and 1200 nm, 1050 nm and 1300 nm, 1050 nm and 1450 nm or 1200 nm and 1450 nm.

According to a preferred embodiment of the invention, it is further provided that a plurality of arrays of radiation and reception units are arranged adjacent to each other, wherein the radiation units of two adjacent groups are arranged in such a manner that the radiation of a respective identical wavelength of one radiation unit, once it has been reflected out of the detection area, can be detected by the reception unit of the respective adjacent array.

Further, it is suitable if the radiation unit and/or the reception unit will emit radiation of a spectral bandwidth of up to 200 nm, preferably below 50 nm.

The radiation unit can comprise a plurality of individual radiation sources which are, at the wavelengths of interest, operative to radiate in the narrow spectral bandwidth. These radiation sources can be LEDs, laser diodes, luminescence radiators or gas discharge lamps, particularly xenon lamps.

It can also be provided, however, that the radiation unit comprises only one radiation source emitting radiation in the narrow spectral bandwidth and particularly as a line spectrum at different wavelengths. Such a radiation source will suitably be a luminescence element radiating a line spectrum with a combination of the required at least two wavelengths.

As a reception unit, there can be used e.g. a photodiode, a phototransistor, a photomultiplier or a CDS element.

Suitably, the wavelength selection can also be realized by a filter unit arranged between the transmission unit and the detection area and/or between the detection area and the reception unit.

Suitably, at least one refractive or reflective optical element is arranged in the path of rays between the radiation unit and the reception unit.

Figure 2:
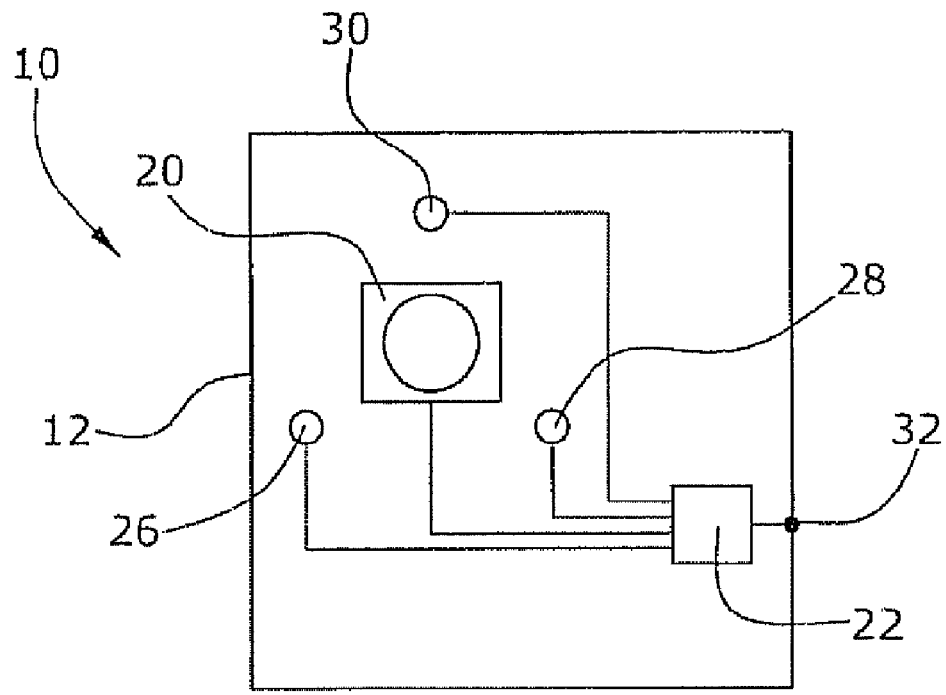

The invention will be explained in greater detail hereunder with reference to the drawings. Specifically, the following is shown therein:

FIG. 1 shows the essential elements of a fingerprint scanner comprising a contactlessly operating skin detector, according to one embodiment of the invention, and FIG. 2 is a plan view of said fingerprint scanner with its essential components.

Hereunder, the invention will be explained with reference to a fingerprint scanner as an example of a biometry detector performing the detection by examination of human tissue.

The apparatus 10 for authenticating a person on the basis of the person's fingerprint comprises a housing 12 having a detection area 16 defined on its upper side 14 and respectively outer side, wherein a person to be authenticated will place one of his/her fingers 18 within said detection area. The fingerprint of this finger 18 will be detected by a fingerprint detector 20 which in the present embodiment is formed as a camera, while, for better survey, the optical system of the camera is not illustrated in the Figures. The image picked up by said detector 20 or, generally, the data acquired by detector 20, is supplied to an signal evaluation unit 22 which can be a component of housing 12 but can also be arranged externally of the housing. In signal evaluation unit 22, the detected data will be compared to the fingerprint data of persons who are considered as authorized to enter the relevant premises and, respectively, to perform the relevant transaction for which an authentication is required.

Apparatus 10 comprises, in addition to fingerprint detector 20, a skin detector 24 for detecting in a contactless manner whether the surface scanned by detector 20 is living skin, i.e. metabolically active human skin.

In the present embodiment, said skin detector 24 comprises two transmission diodes 26,28 and a reception diode 30. The two transmission diodes 26,28 are either laser diodes or illuminating diodes. The transmission diodes are operative to emit electromagnetic radiation in the narrow spectral bandwidth at different wavelengths within the near-infrared range between 900 nm and 1500 nm. The reception diode 30 is of the broad spectral bandwidth type. The three diodes of detector 24 are electrically connected to signal evaluation unit 22 which will evaluate the signals of reception diode 30 and will also drive the transmission diodes 26,28. In the present embodiment, skin sensor 24 comprises an array of the above mentioned three diodes. However, it can also be provided that the detector comprises a plurality of such arrays of diodes.

In case of the skin detector 24 of the presently described type, the trans-mission diode 26 will perform a transmission in the narrow spectral bandwidth, i.e. in a range of 200 nm at the maximum, around a wavelength of 950 nm, while the second transmission diode 28 will also perform a trans-mission in the narrow spectral bandwidth, but at a different wavelength, i.e. at 1540 nm. The radiation successively emitted by the transmission diodes 26,28 will be incident within the detection area 16 of housing 12, from which the radiation which is reflected by the pressed-on finger will be received by the reception diode 30. In as far as, within the detection area 16, there is arranged a human finger 18 with vital, i.e. metabolically active skin, this will result in a characteristic intensity of the re-emission at the two transmission wavelengths. The reception diode 30 will pick up the intensity of the reflected radiations, while the quotient will be computed in the signal evaluation unit 22. This quotient is clearly distinguished from a re-emission quotient obtained by the intensity values of the re-emissions of transmission radiations caused by objects other than living human fingers.

In this manner, it is rendered possible to differentiate between human skin and other objects, and particularly between living human skin and non-living skin. Only if the detector 24 detects living human skin, the signal evaluation unit 22 can emit an authentication signal at 32. The aspect of whether, in case that living human skin has been detected, this authentication signal will really be emitted, will depend on whether the data of the detected fingerprint have been stored, in apparatus 10, as those of a fingerprint of an authorized person, i.e. whether the actual authentication process will confirm the authorization of a person.

As already mentioned above, it can be suitable to provide a plurality of arrays of transmission and reception diodes. This is of advantage if—as is the case for the diodes presently available on the market—these diodes are transmitting only rather weakly at the selected wavelengths. In this regard, the arrangement of the diodes of a plurality of diode arrays is selected such that the emission cones of the two adjacent transmission diodes transmitting at the same wavelength, will overlap with each other when the emission cones are incident on the detection area and respectively the finger, so that the reception diodes will each time capture the re-emission of a plurality of transmission diodes transmitting at identical wavelengths. Accomplished thereby is an increased radiation intensity so that, in this manner, the possible weak radiation intensities of the transmission diodes can be compensated for.

The invention claimed is:

1. An apparatus for authenticating a person on the basis of at least one biometric parameter, comprising
a detector assembly for detection of a biometric parameter and for detection of living human skin within a scanning area, the detector assembly including an array of at least one radiation unit and at least one reception unit for receiving reflected radiations of the at least one radiation unit, and
a signal evaluation unit connected to the detector assembly for evaluation of the intensity of reflected radiations of the at least one radiation unit as received by the at least one reception unit, and
wherein
said at least one radiation unit emits radiation of at least two different wavelengths in a wavelength range between 900 and 1500 nm in a direction toward the scanning area, and said at least one reception unit is positioned to receive the at least two different wavelengths reflected from the scanning area,
the evaluation unit determines whether living human skin is within the scanning area on the basis of the quotients or the differences of said intensities of the reflected radiations of the at least one radiation unit as received by the at least one reception unit at the at least two different wavelengths, and
the detection of living human skin is a precondition for the outputting of an authentication signal.

2. The apparatus according to claim 1, wherein the wavelengths of the radiation unit are wavelengths of 950 nm and 1450 nm, 950 nm and 1050 nm, 950 nm and 1200 nm, 1050 nm and 1200 nm, 1050 nm and 1300 nm, 1050 nm and 1450 nm or 1200 nm and 1450 nm.

3. The apparatus according to claim 1, wherein a plurality of arrays of radiation and reception units are arranged adjacent to each other, the radiation units of two adjacent groups being arranged in such a manner that the radiation of a respective identical wavelength of one radiation unit, after having been reflected out of the detection area, can be detected by the reception unit of the respective adjacent array.

4. The apparatus according to claim 1, wherein, in the signal evaluation unit, ambient light received by the reception unit can be compensated for.

5. The apparatus according to claim 1, wherein the intensities of the reflected radiations evaluated by the evaluation unit are over a spectral bandwidth of up to 200 nm for each of at least two of the at least two different wavelengths.

6. The apparatus according to claim 5, wherein the radiation unit is operative for radiation in the narrow spectral bandwidth and the reception unit is operative for reception of broad-spectral-bandwidth radiation, or the radiation unit is operative for radiation in the broad spectral bandwidth and the reception unit is operative for reception of said radiation of the narrow spectral bandwidth.

7. The apparatus according to claim 5, wherein the radiation unit is operative for radiation in the narrow spectral bandwidth and the reception unit is operative for reception of broad-spectral-bandwidth radiation, or the radiation unit is operative for radiation in the broad spectral bandwidth and the reception unit is operative for reception of said radiation of the narrow spectral bandwidth.

8. The apparatus according to claim 7, wherein a wavelength-selective filter unit is provided which is arranged between the radiation unit and the detection area and/or between the detection area and the reception unit.

9. The apparatus according to claim 7, wherein at least one refractive or reflective optical element is arranged in the path of rays between the radiation unit and the reception unit.

10. The apparatus according to claim 5, wherein the spectral bandwidth is less than 50 nm.

11. The apparatus according to claim 1, wherein the radiation unit comprises radiation sources emitting at least two radiations at different wavelengths, said radiation sources being LEDs, laser diodes, luminescence radiators or gas discharge lamps.

12. The apparatus according to claim 11, wherein the reception unit is a photodiode, a phototransistor, a photomultiplier or a CDS element.

13. The apparatus according to claim 11, wherein the radiation unit is operative for radiation in the narrow spectral bandwidth and the reception unit is operative for reception of broad-spectral-bandwidth radiation, or the radiation unit is operative for radiation in the broad spectral bandwidth and the reception unit is operative for reception of said radiation of the narrow spectral bandwidth.

14. The apparatus according to claim 1, wherein the radiation unit comprises at least one radiation source emitting radiation at different wavelengths, said radiation source being a luminescence element radiating a line spectrum with a combination of the required at least two different wavelengths.

15. The apparatus according to claim 14, wherein the radiation unit is operative for radiation in the narrow spectral bandwidth and the reception unit is operative for reception of broad-spectral-bandwidth radiation, or the radiation unit is operative for radiation in the broad spectral bandwidth and the reception unit is operative for reception of said radiation of the narrow spectral bandwidth.

16. The apparatus according to claim 1, wherein the reception unit is a photodiode, a phototransistor, a photomultiplier or a CDS element.

17. The apparatus according to claim 16, wherein the radiation unit is operative for radiation in the narrow spectral bandwidth and the reception unit is operative for reception of broad-spectral-bandwidth radiation, or the radiation unit is operative for radiation in the broad spectral bandwidth and the reception unit is operative for reception of said radiation of the narrow spectral bandwidth.

18. The apparatus according to claim 1, wherein a wavelength-selective filter unit is provided which is arranged between the radiation unit and the detection area and/or between the detection area and the reception unit.

19. The apparatus according to claim 1, wherein at least one refractive or reflective optical element is arranged in the path of rays between the radiation unit and the reception unit.

20. The apparatus according to claim 1, wherein the radiation unit comprises at least one radiation source emitting radiation at different wavelengths, said radiation source being a luminescence element radiating a line spectrum with a combination of the required at least two different wavelengths.

21. The apparatus according to claim 1, wherein said at least one radiation unit emits radiation of at least three different wavelengths in a wavelength range between 900 and 1500 nm in the direction toward the scanning area, and said at least one reception unit receives radiation reflected from the scanning area.

* * * * *